United States Patent [19]
Ito

[11] Patent Number: 5,232,289
[45] Date of Patent: Aug. 3, 1993

[54] STUD TYPE TRACK ROLLER BEARING

[75] Inventor: Kenichi Ito, Kani, Japan

[73] Assignee: Nippon Thompson Co., Ltd., Japan

[21] Appl. No.: 878,804

[22] Filed: May 5, 1992

[30] Foreign Application Priority Data

May 9, 1991 [JP] Japan .................. 3-132187

[51] Int. Cl.$^5$ .............................................. F16C 19/49
[52] U.S. Cl. ........................................ 384/46; 384/48;
384/449; 384/454
[58] Field of Search ............... 384/46, 454, 48, 449,
384/516, 615

[56] References Cited

U.S. PATENT DOCUMENTS

| 1,642,979 | 9/1927 | Timbs et al. .................. 384/46 |
| 2,197,499 | 4/1940 | Heinze ........................... 384/454 |
| 2,208,724 | 7/1940 | Griswold ........................ 384/454 |
| 4,914,712 | 4/1990 | Ikimi et al. .................... 384/449 |

Primary Examiner—Lenard A. Footland
Attorney, Agent, or Firm—Skjerven, Morrill, MacPherson, Franklin & Friel

[57] ABSTRACT

A stud type track roller bearing includes a shaft provided with a flange, an annular side plate located in an opposed relationship and fixedly attached to the shaft, a ring fitted onto the flange, a plurality of rollers interposed between the ring and the shaft, a plurality of balls interposed between the ring and the flange also between the ring and the side plate, a retainer for retaining the rollers in position. The rollers mainly serve to support the load in the radial direction and the balls mainly serve to support the load in the axial direction.

7 Claims, 3 Drawing Sheets

1

STUD TYPE TRACK ROLLER BEARING

BACKGROUND OF THE INVENTION

1. Field of the Invention

This invention generally relates to a roller bearing, and, in particular, to a stud type track roller bearing for use in rolling along a guide path of a cam or a straight path of a guide rail.

2. Description of the Prior Art

A stud type track roller bearing is well known in the art and it is also referred to as a cam follower. A stud type roller bearing generally includes a shaft (stud) having a flange at one end, a ring fitted onto the shaft, a plurality of rollers interposed between the shaft and the ring, a retainer for retaining the rollers in position, and a side plate tightly fitted onto the shaft in an opposed relationship with the flange to keep the ring and the rollers in position. In this conventional stud type track roller bearing, when a thrust is produced in the ring because the rollers are skewed, a side wall of the ring is brought into a sliding contact with either the flange or the side plate so that the thrust is absorbed through such a physical contact between the ring and either one of the flange or the side plate. However, if the thrust is relatively large, a significant heat can be produced through such a physical contact, and, as a result, stacking due to burning could result at such a sliding contact. Thus, the bearing could become stuck due to heating in a relatively short period of time under relatively severe conditions, such as the mounting errors are relatively large, the rotating speed is relatively high, and/or the load is relatively large.

In order to cope with the above-described situation, there has been proposed a stud type track roller bearing employing a special thrust washer as disclosed int he Japanese Utility Model Application No. 2-47417 assigned to the assignee of this application. The roller bearing disclosed in this U. M. application is schematically shown in FIGS. 5 and 6 of this application. As shown in FIGS. 5 and 6, this stud type track roller bearing generally includes a ring 11, a shaft or stud 13, a plurality of rollers 121, a retainer 14, a thrust washer 15 and a side plate 16.

The ring 11 has a relatively large thickness and a guide surface 11a is defined along its inner peripheral surface. In addition, a recessed portion 11b having a diameter larger than the inner diameter of the ring 11 is formed on both sides of the ring 11. The shaft 13 is also provided with a guide surface 13a in an opposed relationship with the guide surface 11a of the ring 11. The shaft 13 is, moreover, provided at its one end with a flange 13c having a diameter slightly smaller than the diameter of the recessed portion 11b, so that the flange 13c may be located inside a corresponding recessed portion 11b. The shaft 13 is also provided with a threaded section 13b at the other end for coupling with another element.

When the shaft 13 is fitted into the ring 11, a gap is created between the guide surface 11a of the ring 11 and the opposed guide surface 13a of the shaft 13, and a plurality of rollers 12 are disposed in this gap circumferentially and spaced apart from each other in rolling contact with both of these guide surfaces 11a and 13a. The retainer 14 is also disposed in this gap so as to keep the rollers 12 in position and spaced apart from each other. The side plate 16 having a center hole is tightly fitted onto the shaft 13, for example, through an interference fit and located adjacent to one side of the guide surface 13a in an opposed relationship with the flange 13c. The side plate 16 has an outer diameter which is slightly smaller than the diameter of the recessed portion 11b so that the side plate 16 is also located inside its associated recessed portion 11b when set in position. In the illustrated example, since the guide surface 13a is defined as a peripheral surface of a portion of the shaft 13 which has a larger diameter, the side plate 16 is set in position by bringing in contact with a step of such a larger diameter portion.

The thrust washer 15 is rotatably provided between one side of the ring 11 and the flange 13c and also between the opposite side of the ring 11 and the side plate 16. As shown in FIG. 6, the thrust washer 15 is formed with a plurality of substantially spherically shaped pockets 15a for reserving therein a quantity of lubricant. Thus, the thrust washer 15 is expected to provide a well lubricated contact between the ring 11 and the flange 13c and/or side plate 16, thereby preventing the bearing from becoming stuck due to heating.

However, in the prior art structure, since the contact surface between the ring 11 and the flange 13c or side plate 16 is relatively small so that the load per unit area is relatively large, there is still a danger that the bearing becomes stuck due to excessive heating particularly when the thrust load is relatively large and/or the rotating speed is relatively large. In addition, since the thrust washer 15 is provided with a plurality of substantially spherically shaped pockets 15a, the actual contact between the ring 11 and the flange 13c or side plate 16 is reduced, which in turn increases the load per unit area. Moreover, difficulty is encountered in fabricating such a thrust washer 15. Besides, since the gap between the ring 11 and the flange 13c or side plate 16 must be set as small as possible from the viewpoint of preventing any foreign matter from sneaking in, such a condition makes it difficult to manufacture the bearing and thus tends to push up the cost. Finally, since the prior art structure basically relies on the sliding contact using the thrust washer 15, a relatively large torque is required and the thrust washer 15 becomes worn so that the characteristic may fluctuate. Thus, the prior art structure is not suited for high speed applications.

SUMMARY OF THE INVENTION

In accordance with the present invention, there is provided an improved stud type track roller bearing which generally includes a ring, a shaft having a flange at its one end, an annular side plate fitted onto and fixedly attached to the shaft in an opposed relationship with the flange, a plurality of rollers interposed between the shaft and the ring, and a retainer for retaining the rollers in position. In accordance with the principle of the present invention, a pair of circular guide channels is provided, one between the ring and the flange and the other between the ring and the side plate, and a plurality of rolling member are provided in these circular guide channels. In a preferred embodiment, the rolling members are balls and each of the circular guide channels is defined by a pair of oppositely arranged circular guide grooves. Preferably, each of the circular guide grooves has a guide surface which establishes a contact angle with the balls in a range between 45° and 90°.

It is therefore an object of the present invention to provide an improved stud type track roller bearing having an increased load bearing capability both for axial and radial loads.

Another object of the present invention is to provide an improved stud type track roller bearing high in performance and smooth in operation.

A further object of the present invention is to provide an improved stud type track roller bearing simple in structure and easy and inexpensive to manufacture.

A still further object of the present invention is to provide an improved stud type track roller bearing capable of operating at high speeds and providing a prolonged service life.

Other objects, advantages and novel features of the present invention will become apparent from the following detailed description of the invention when considered in conjunction with the accompanying drawings.

DESCRIPTION OF THE PREFERRED EMBODIMENTS

Figure 1:
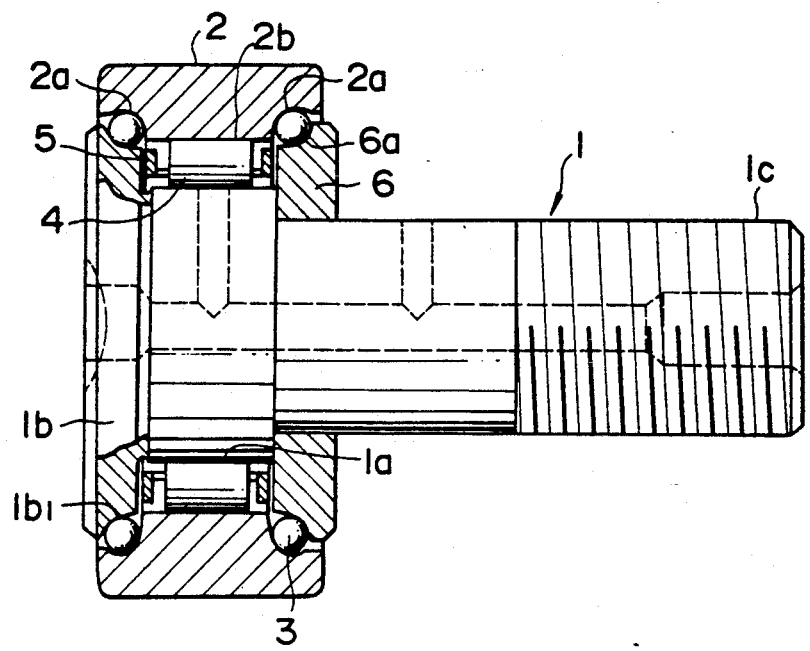
FIG. 1 is a schematic illustration showing in longitudinal cross section a stud type track roller bearing constructed in accordance with one embodiment of the present invention.

Referring now to FIG. 1, there is schematically shown a stud type track roller baring constructed in accordance with one embodiment of the present invention. As shown, the present stud type track roller bearing generally includes a shaft or stud 1 having a flange 1b, a ring 2 fitted onto the shaft 1 with a gap therebetween, an annular side plate 6 tightly fitted onto the shaft 1 in an opposed relationship with the flange 1b, a plurality of rollers 4 as first rolling members interposed between the shaft 1 and the ring 2, a plurality of balls 3 as second rolling members interposed between the ring 2 and the flange 1b and between the ring 2 and the side plate 6, and a retainer 5 for retaining the rollers 4 in position.

Figure 2:
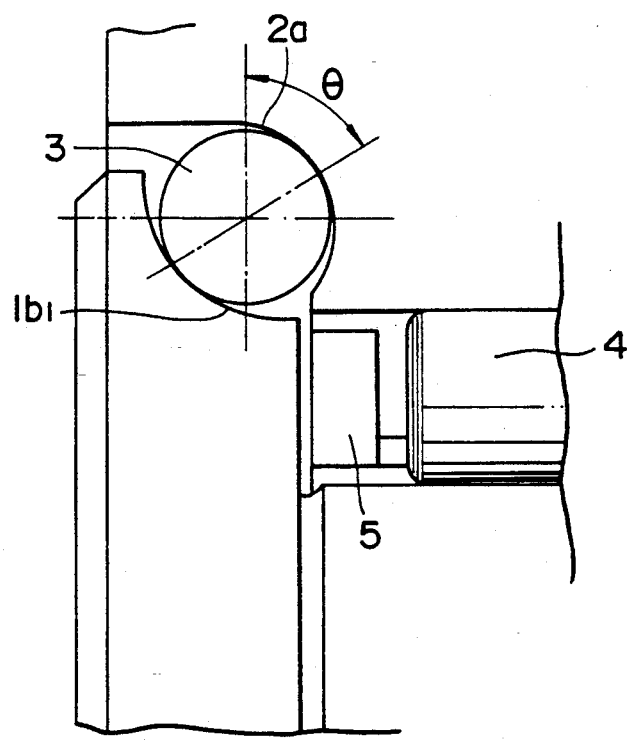
FIG. 2 is a schematic illustration showing on an enlarged scale a rolling contact condition between the ring and the flange through a ball in the bearing shown in FIG. 1.

In the illustrated embodiment, the shaft 1 includes a large diameter section 1a whose outer peripheral surface defines a roller guide surface, a flange 1b at its left end, and a threaded section 1c at its right end portion. In the illustrated embodiment, the threaded section 1c extends from the left end approximately halfway toward the large diameter section 1a. The flange 1b is formed with a first outer guide groove $1b_1$ having a circular cross section whose diameter is larger than the diameter of a ball 3. As best shown in FIG. 2, in a preferred embodiment, the first outer guide groove $1b_1$ is so provided to set a contact angle $\theta$ in a range between 45 degrees and 90 degrees. The ring 2 is also formed with a first outer guide groove 2a having a circular cross section whose diameter is also larger than the diameter of the ball 3. These first inner and outer guide grooves $1b_1$ and 2a are located opposite to each other when assembled to thereby define a first guide channel for receiving therein a plurality of balls 3. In this case also, a contact angle $\theta$ between the ball 3 and the first outer guide groove 2a is set in a range between 45 degrees and 90 degrees.

The side plate 6 is located adjacent to a stepped portion of the large diameter section 1a and fixedly attached to the shaft 1, for example, through an interference fit. The side plate 6 may be welded or bolted to the shaft 1, if desired. The side plate 6 is also formed with a second inner guide groove 6a having a circular cross section whose diameter is larger than the diameter of the ball 3. Since the ring 2 is also formed with a second outer guide groove $1b_1$ located opposite to the second inner guide groove 6a of the side plate 6, there is also provided a second guide channel for receiving therein the balls 3. A contact angle in this second guide channel should also be set in a range between 45 degrees and 90 degrees. However, it should be noted that the contact angle may be set at different values between the first and second guide channels, if desired.

In the illustrated embodiment, the ring 2 is constructed to be thicker in its middle section to thereby define a peripheral guide surface 2b in an opposed relationship with the peripheral guide surface of the large diameter section 1a of the shaft 1. Thus, a third guide channel is defined between these opposed peripheral guide surfaces 2a and 1a, and a plurality of rollers 4 are provided in tis guide channel as spaced part from each other in a circumferential direction in rolling contact with both of these peripheral guide surfaces 2a and 1a. A retainer 5 for retaining the rollers in position is also provided in the third guide channel. Thus, the rollers 4 serve to sustain the load in the radial direction. On the other hand, the balls 3 in the first and second guide channels serve to sustain the load mainly in the axial direction. Therefore, if a thrust force is applied to the ring 1 for some reason, for example, due to skewing of the rollers 4 because of the presence of mounting errors, such a thrust force can be conveniently sustained or absorbed by the ball bearing mechanisms. In this case, since the balls 4 provide a rolling contact versus a sliding contact in the case where use is made of the thrust washer in the prior art as described above, no problems arise even if the present bearing is operated at high speeds.

It is to be noted that an internal path indicated by the dotted lines in FIG. 1 is a path for distributing a lubricant to desired locations through the shaft 1.

Figure 3:
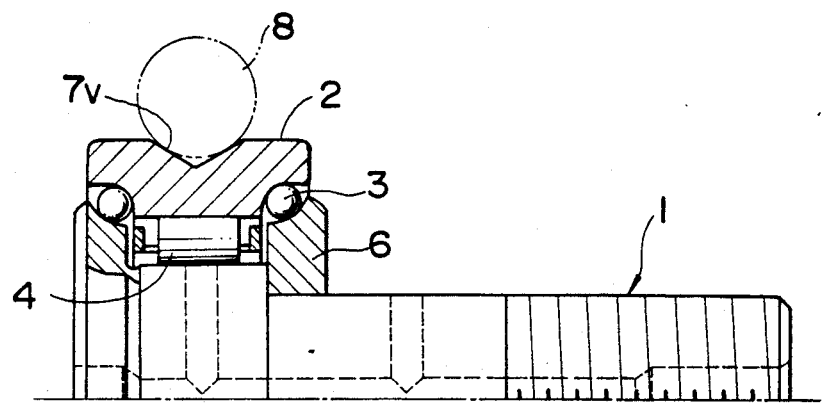
FIG. 3 is a schematic illustration showing in longitudinal cross section a modification of the stud type track roller bearing shown in FIG. 1.
Figure 4:
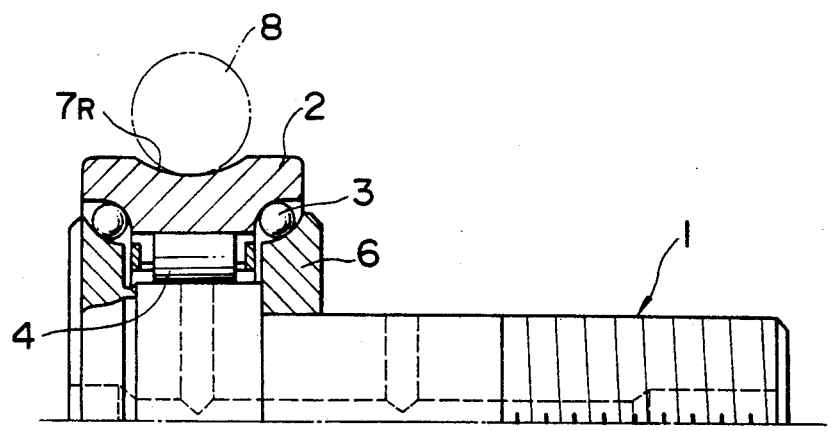
FIG. 4 is a schematic illustration showing in longitudinal cross section another modification of the stud type track roller bearing shown in FIG. 1.
Figure 5:
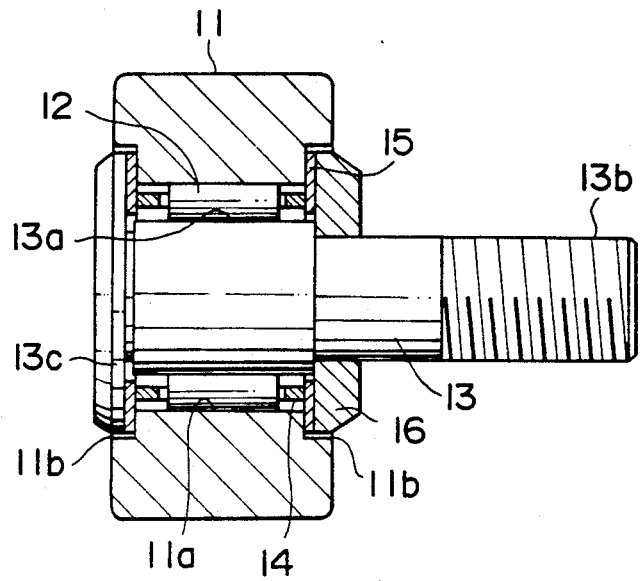
FIG. 5 is a schematic illustration showing in longitudinal cross section a typical prior art stud type track roller bearing.
Figure 6:
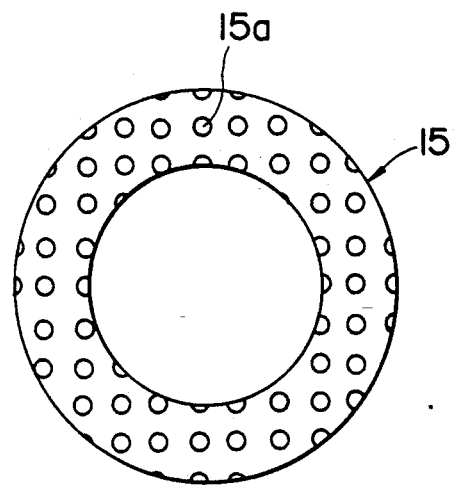
FIG. 6 is a schematic illustration showing in front view the thrust washer employed in the bearing shown in FIG. 5.

FIGS. 3 and 4 illustrate a few modifications of the stud type track roller bearing shown in FIGS. 1 and 2. Since these modifications are similar in many respects to the previous embodiment described above with reference to FIGS. 1 and 2, like numeral are used to indicate like elements. The embodiments shown in FIGS. 3 and 4 differ from the above-described embodiment only in the shape of an outer peripheral surface of the ring 2. That is, in the embodiment shown in FIG. 3, the outer peripheral surface of the ring 2 is formed with a V-shaped groove 7v. In the illustrated embodiment, the V-shaped groove 7v has an angle of 120 degrees and in sliding contact with a shaft 8 having a circular cross section and extending in a direction normal to the longitudinal axis of the shaft 1. The angle of V-shaped groove 7v may be set in a range between 90 degrees and 150 degrees. With this modification, the associated shaft 8 may have any other cross sectional shape, such as a rectangular or triangular cross sectional shape, if desired.

On the other hand, FIG. 4 illustrates another modification in which the outer peripheral surface of the ring 2 is formed with a groove having a circular cross section 7R having a radius of curvature larger than the diameter of the associated shaft 8. In this case, a larger contact surface can be secured between the ring 2 and the associated shaft 8 than that in the previous modification shown in FIG. 3.

While the above provides a full and complete disclosure of the preferred embodiments of the present invention, various modifications, alternate construction and equivalent may be employed without departing from the true spirit and scope of the invention. Therefore, the above description and illustration should not be construed as limiting the scope of the invention, which is defined by the appended claims.

What is claimed is:

1. A stud type track roller bearing, comprising:
   a shaft extending over a length and including a flange;
   an annular side plate fixedly attached to said shaft in an opposed relationship with said flange in an axial direction;
   a ring fitted onto said shaft to define a first gap therebetween and also between said flange and said side plate as a first guide channel and a pair of second gaps, one between said ring and said flange and the other between said ring and said side plate, as a pair of second guide channels;
   a plurality of first rolling members provided in said first guide channel in rolling contact with both of said ring and said shaft; and
   a plurality of second rolling members different in kind from said first rolling members provided in said pair of second guide channels in rolling contact with said ring and either of said flange and said side plate.

2. The bearing of claim 1, wherein said first rolling members are roller and said second rolling members are balls.

3. The bearing of claim 1, wherein one of said pair of second guide channels is defined by a first outer guide groove formed in said ring and a first inner guide groove formed in said flange and located in an opposed relationship with said first outer guide groove when assembled and the remaining one of said pair of second guide channels is defined by a second outer guide groove formed in said ring and a second inner guide groove formed in said side plate in an opposed relationship with said second outer guide groove when assembled.

4. The bearing of claim 3, wherein a contact angle of said balls in each of said first and second guide channels is set in a range between 45 degrees and 90 degrees.

5. The bearing of claim 4, wherein different contact angles are set for the first and second guide channels, respectively.

6. The bearing of claim 1, wherein said ring is formed with a V-shaped groove in its outer peripheral surface extending in a circumferential direction.

7. The bearing of claim 1, wherein said ring is formed with a groove having a circular cross section in its outer peripheral surface extending in a circumferential direction.

* * * * *